(12) United States Patent
Gupta et al.

(10) Patent No.: US 9,879,580 B2
(45) Date of Patent: Jan. 30, 2018

(54) DIAGNOSTIC METHODS FOR A HIGH EFFICIENCY EXHAUST AFTERTREATMENT SYSTEM

(71) Applicant: Cummins, Inc., Columbus, IN (US)

(72) Inventors: Aniket Gupta, Wuhan (CN); Michael J. Cunningham, Greenwood, IN (US); Michael Haas, Columbus, IN (US); Govindarajan Kothandaraman, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 62 days.

(21) Appl. No.: 14/830,112

(22) Filed: Aug. 19, 2015

(65) Prior Publication Data

US 2017/0051654 A1 Feb. 23, 2017

(51) Int. Cl.
| | | |
|---|---|---|
| *F01N 3/00* | (2006.01) | |
| *F01N 3/035* | (2006.01) | |
| *F01N 3/08* | (2006.01) | |
| *F01N 3/10* | (2006.01) | |
| *F01N 3/20* | (2006.01) | |
| *F01N 11/00* | (2006.01) | |
| *F01N 13/00* | (2010.01) | |

(52) U.S. Cl.
CPC ............ *F01N 3/035* (2013.01); *F01N 3/0835* (2013.01); *F01N 3/0842* (2013.01); *F01N 3/103* (2013.01); *F01N 3/2066* (2013.01); *F01N 11/00* (2013.01); *F01N 13/0093* (2014.06); *F01N 2550/02* (2013.01); *F01N 2560/021* (2013.01); *F01N 2560/026* (2013.01); *F01N 2560/06* (2013.01); *F01N 2560/14* (2013.01); *F01N 2610/02* (2013.01); *F01N 2900/1402* (2013.01); *F01N 2900/1616* (2013.01); *Y02T 10/24* (2013.01); *Y02T 10/47* (2013.01)

(58) Field of Classification Search
CPC ...... F01N 3/035; F01N 3/0835; F01N 3/0842; F01N 3/103
USPC .......................................................... 60/285
See application file for complete search history.

(56) References Cited

U.S. PATENT DOCUMENTS

| | | |
|---|---|---|
| 8,091,416 B2 | 1/2012 | Wang et al. |
| 8,256,208 B2 | 9/2012 | Wills et al. |
| 8,336,525 B2 | 12/2012 | Runde et al. |
| 2006/0153761 A1* | 7/2006 | Bandl-Konrad ... B01D 53/9431 423/239.1 |

(Continued)

*Primary Examiner* — Jason Shanske
(74) *Attorney, Agent, or Firm* — Foley & Lardner LLP

(57) ABSTRACT

An apparatus includes a nitrogen oxide (NOx) module and a selective catalytic reduction (SCR) diagnostic module. The NOx module is in exhaust gas communication with an exhaust flow of an exhaust aftertreatment system from an engine. The NOx module is structured to interpret NOx data indicative of an amount of NOx exiting the engine and an amount of NOx exiting the exhaust aftertreatment system, and determine a NOx conversion efficiency fault is present based on the amount of NOx exiting the engine and the amount of NOx exiting the exhaust aftertreatment system. The SCR diagnostic module is structured to determine at least one of a SCR catalyst and a diesel particulate filter including a coating of a SCR reaction catalyst (DPF-SCR) are responsible for the NOx conversion efficiency fault based on at least one of a reductant slip amount and a NOx conversion value across at least one of the SCR catalyst and the DPF-SCR.

15 Claims, 7 Drawing Sheets

(56) References Cited

U.S. PATENT DOCUMENTS

| | | | |
|---|---|---|---|
| 2012/0144801 A1 | 6/2012 | Levijoki et al. | |
| 2015/0086426 A1* | 3/2015 | DeGeorge | F01N 11/007 422/108 |
| 2015/0147250 A1* | 5/2015 | Nigro | F01N 3/2066 423/212 |
| 2015/0231565 A1* | 8/2015 | Wittrock | B01D 53/9477 423/212 |
| 2015/0240682 A1* | 8/2015 | Gupta | F01N 9/00 60/274 |

* cited by examiner

DIAGNOSTIC METHODS FOR A HIGH EFFICIENCY EXHAUST AFTERTREATMENT SYSTEM

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing.

Exhaust aftertreatment systems are generally designed to reduce emission of particulate matter, nitrogen oxides (NOx), hydrocarbons, and other environmentally harmful pollutants. However, the components that make up the exhaust aftertreatment system can be susceptible to failure and degradation. Because the failure or degradation of components may have adverse consequences on performance and the emission-reduction capability of the exhaust aftertreatment system, the detection and, if possible, correction of failed or degraded components is desirable. In fact, some regulations require on-board diagnostic (OBD) monitoring or testing of many of the components of the exhaust aftertreatment system. However, as exhaust aftertreatment system architectures become increasingly more complex, the ability to isolate faults to specific components within the aftertreatment system becomes more challenging. Accordingly, a need exists for repeatable and high accuracy fault isolation within the exhaust aftertreatment system.

SUMMARY

One embodiment relates to an apparatus. The apparatus includes a nitrogen oxide (NOx) module and a selective catalytic reduction (SCR) diagnostic module. The NOx module is in exhaust gas communication with an exhaust flow of an exhaust aftertreatment system from an engine. The NOx module is structured to interpret NOx data indicative of an amount of NOx exiting the engine and an amount of NOx exiting the exhaust aftertreatment system, and determine a NOx conversion efficiency fault is present based on the amount of NOx exiting the engine and the amount of NOx exiting the exhaust aftertreatment system. The SCR diagnostic module is structured to determine at least one of a SCR catalyst and a diesel particulate filter including a coating of a SCR reaction catalyst (DPF-SCR) are responsible for the NOx conversion efficiency fault based on at least one of a reductant slip amount and a NOx conversion value across at least one of the SCR catalyst and the DPF-SCR.

Another embodiment relates to a method. The method includes determining a Nitrogen Oxide (NOx) conversion efficiency fault is present within an exhaust aftertreatment system, monitoring an actual amount of NOx of an exhaust flow of the exhaust aftertreatment system downstream of a selective catalytic reduction (SCR) catalyst when a reductant is injected into the exhaust flow via an injection mechanism positioned upstream of the SCR catalyst, determining an expected amount of NOx of the exhaust flow of the exhaust aftertreatment system downstream of the SCR catalyst when the reductant is injected into the exhaust flow upstream of the SCR catalyst based on at least one operating condition of at least one of the exhaust aftertreatment system and an engine in fluid communication with the exhaust aftertreatment system, comparing the actual amount of NOx to at least one of the expected amount of NOx and a threshold value of NOx, and determining the SCR catalyst is faulty responsive to at least one of the actual amount of NOx differing from the expected amount of NOx by more than a threshold amount and the actual amount of NOx exceeding the threshold value of NOx.

Still another embodiment relates to a method. The method includes determining a Nitrogen Oxide (NOx) conversion efficiency fault is present, monitoring an actual amount of reductant downstream of a diesel particulate filter including a coating of a selective catalytic reduction reaction catalyst (DPF-SCR) when the reductant is injected into the exhaust flow via an injection mechanism positioned upstream of the DPF-SCR, determining an expected amount of reductant downstream of the DPF-SCR based on at least one of the operating conditions of an engine and operating conditions of the exhaust aftertreatment system, comparing the actual amount of reductant to the expected amount of reductant, and determining the DPF-SCR is faulty responsive to the actual amount of reductant being greater than the expected amount of reductant.

Yet another embodiment relates to a system. The system includes an engine, an exhaust aftertreatment system in exhaust gas receiving communication with the engine, and a controller. The exhaust aftertreatment system includes a selective catalytic reduction (SCR) system. The SCR system includes a SCR catalyst and a diesel particulate filter having a coating of a SCR reaction catalyst (DPF-SCR) positioned upstream of the SCR catalyst. The controller is communicably coupled to the engine and the exhaust aftertreatment system. The controller is structured to receive first nitrogen oxide (NOx) data indicative of an amount of NOx in an exhaust flow exiting the engine and second NOx data indicative of an amount of NOx in the exhaust flow exiting the exhaust aftertreatment system, determine a NOx conversion efficiency fault is present based on the first NOx data and the second NOx data, and determine at least one of the SCR catalyst and the DPF-SCR of the SCR system are faulty responsive to the NOx conversion efficiency fault.

These and other features, together with the organization and manner of operation thereof, will become apparent from the following detailed description when taken in conjunction with the accompanying drawings.

DETAILED DESCRIPTION

Figure 1:
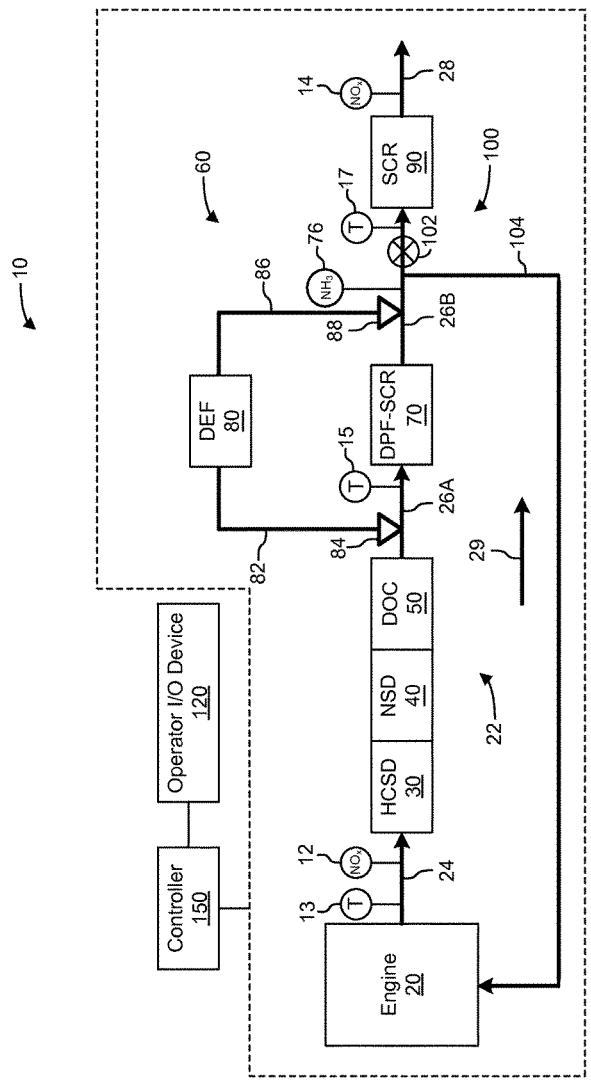
FIG. 1 is a schematic diagram of an exhaust aftertreatment system with a controller, according to an example embodiment.

Referring to the Figures generally, the various embodiments disclosed herein relate to a system, apparatus, and method of diagnosing a faulty component of an exhaust aftertreatment system. According to the present disclosure, a controller determines whether (among other failure modes) a component of a SCR system (e.g., a DPF-SCR, a SCR catalyst, etc.) are faulty by utilizing one or more diagnostic procedures, which are described more fully herein. As a brief overview, some engine systems include exhaust aftertreatment systems for decreasing the pollutants emitted from the engine systems. Among other components, these exhaust aftertreatment systems may include a SCR system. The SCR system can include a DPF-SCR and a SCR catalyst that are designed to reduce the amount of nitrogen oxides (NOx) and other constituents in engine exhaust gas to nitrogen and other less pollutant compounds. To accomplish this reduction, a reductant (e.g., ammonia, urea, etc.) is sprayed into the exhaust gas at least one of prior to the exhaust gas reaching the DPF-SCR and the SCR catalyst of the SCR system. Over the DPF-SCR and the SCR catalyst, the NOx reacts with ammonia ($NH_3$) that is formed from the decomposition of the reductant or that was sprayed directly into the exhaust gas, to form nitrogen and other less harmful compounds. In turn, a decrease in NOx emissions from the exhaust gas is accomplished. The efficiency of the SCR system may be determined by measuring the reduction of NOx emissions from the exhaust gas between the inlet and the outlet of the SCR system, which is described more fully below.

In certain embodiments, SCR system efficiency may be determined by a NOx conversion fraction for the exhaust gas. The NOx conversion fraction may be determined from NOx data regarding the exhaust gas emitted from the engine. For example, the NOx data may include an inlet amount of NOx entering the exhaust aftertreatment system (represented as NOx, inlet in equation (1) below). The NOx data may also include an outlet amount of NOx exiting the exhaust aftertreatment system (represented as NOx, outlet in equation (1) below). Taking a difference between these two amounts, the NOx conversion fraction represents the percent reduction in NOx in the exhaust gas stream accomplished by the SCR system. According to one embodiment, the NOx conversion fraction amount may be determined as follows:

$$NO_x \text{ conversion fraction} = \frac{NO_{x_{inlet}} - NO_{x_{outlet}}}{NO_{x_{inlet}}} \quad (1)$$

The NOx conversion fraction provides an indication of the efficacy of the SCR system and whether a potential NOx conversion efficiency fault may be present. For example, a relatively higher conversion fraction indicates that a substantial amount of the NOx present in the exhaust stream is being reduced to nitrogen and other less pollutant compounds. However, a relatively lower conversion fraction indicates that the NOx in the exhaust gas stream is substantially not being converted to nitrogen and other less pollutant compounds (i.e., one or more components of the SCR system may be faulty, etc.).

According to the present disclosure, a controller is structured to determine a DPF-SCR and/or an underfloor SCR catalyst failure responsive to the NOx conversion efficiency of the SCR system indicating a NOx conversion efficiency fault. The controller is structured to perform a diagnostic test or process that diagnoses the NOx conversion efficiency fault and isolates the fault to the DPF-SCR and/or the underfloor SCR catalyst, respectively. A typical characteristic of a failed SCR system is a complete loss or a partial loss of catalytic activity of a catalyst element (i.e., the DPF-SCR and SCR catalyst, etc.) to an extent where the system outlet NOx levels are above regulated limits (i.e., emission laws and regulations, etc.). The loss of catalytic activity may directly correspond to at least one of (i) a low NOx conversion and (ii) a low total ammonia storage capacity (or a higher tendency to slip ammonia). The diagnostic test may utilize available actuators and sensors (or virtual sensors) to detect the above functionalities of a failed system and isolate the failure to at least one of the DPF-SCR and the SCR catalyst. The loss of partial or complete catalytic activity of the SCR system may result in higher sensitivity to exhaust flux or NOx flux based space velocity (the volume of flow per unit volume of the catalyst). For the exhaust aftertreatment system architecture described herein, the actuators in the system may be used to further tax the DPF-SCR and the underfloor SCR catalyst with high space velocity and the sensor data may be used to diagnose the faults robustly and with higher in use performance ratio (the percentage of time for which the diagnostic test may be run in the operating region of the engine and the exhaust aftertreatment system).

In one embodiment, a passive diagnostic test may be performed while the engine and exhaust aftertreatment system are operational. For example, if embodied in a vehicle, the passive test may be performed while the operator is driving the vehicle. If an error is detected, a fault code or indicator lamp may be actuated to alert the operator of maintenance or service that may be required. In contrast and in another embodiment, an intrusive diagnostic test may be performed. As used herein, the term "intrusive" (in regard to performing one or more diagnostic tests) is used to refer to an active diagnostic test. In other words, an intrusive method, system, and apparatus describe a diagnostic test or protocol that is forced to run on the engine and exhaust aftertreatment system (i.e., causes the engine to operate at a certain speed, etc.). An intrusive diagnostic test may manipulate or excite the NOx emissions in the exhaust gas emitted from the engine system. In this regard, an "intrusive diagnostic test" may include overriding various set engine operating points to perform the diagnostic test. For example, many engine operating points are set to be in compliance with one or more vehicular laws (e.g., emissions, etc.). By overriding one or more of these operating points, the engine may be forced into non-compliance with one or more vehicular laws. As a result, the active or intrusive diagnostic test is often run in a service bay, test center environment, or other controlled environment.

Referring now to FIG. 1, an engine system, shown as engine system 10, with a controller 150 is shown, according to an example embodiment. As shown in FIG. 1, the engine system 10 includes an internal combustion engine, shown as engine 20, and an aftertreatment system, shown as exhaust aftertreatment system 22. The exhaust aftertreatment system 22 is in exhaust gas-receiving communication with the engine 20. According to one embodiment, the engine 20 is structured as a compression-ignition internal combustion engine that utilizes diesel fuel. However, in various alternate embodiments, the engine 20 may be structured as any other type of engine (e.g., spark-ignition, etc.) that utilizes any type of fuel (e.g., gasoline, natural gas, etc.). Within the engine 20, air from the atmosphere is combined with fuel, and combusted, to power the engine 20. Combustion of the fuel and air in the compression chambers of the engine 20 produces exhaust gas that is operatively vented to an exhaust manifold and to the exhaust aftertreatment system 22.

According to the example embodiment depicted in FIG. 1, the exhaust aftertreatment system 22 includes a low temperature hydrocarbon storage device (HCSD), shown as HCSD 30, that is upstream and fluidly coupled to a low temperature nitrogen oxide storage device (NSD), shown as NSD 40, which is upstream and in fluid communication with a diesel oxidation catalyst (DOC), shown as DOC 50. The DOC 50 is shown to be upstream and in fluid communication with a selective catalytic reduction (SCR) system, shown as SCR system 60. The SCR system 60 includes a diesel particulate filter having a coating of a selective catalytic reduction reaction catalyst, shown as DPF-SCR 70; a reductant delivery system, shown as diesel exhaust fluid (DEF) delivery system 80, and an underfloor SCR catalyst, shown as SCR catalyst 90.

The HCSD 30 is structured to temporarily store hydrocarbons (HC) at low temperatures (e.g., relative to exhaust gases, etc.). The HCSD 30 is further structured to passively release the HC responsive to the temperature of the exhaust gas increasing (e.g., when the engine 20 is warmed up, running at designed operating conditions, etc.). As the temperature of the exhaust gas increases, the released HC from the HCSD 30 is converted to $CO_2$ and $H_2O$ by the DOC 50 located downstream of the HCSD 30. The NSD 40 is structured to temporarily store nitrogen oxides (NOx) at low temperatures (e.g., relative to exhaust gases, etc.). The NSD 40 is further structured to passively release the NOx responsive to the temperature of the exhaust gas increasing (e.g., when the engine 20 is warmed up, running at designed operating conditions, etc.). As the temperature of the exhaust gas increases, the released nitrogen monoxide (NO) of the NOx from the NSD 40 is partially oxidized to $NO_2$ (e.g., by the DOC 50, etc.) before effectively being converted to $N_2$ and $H_2O$ by the DPF-SCR 70 located downstream of the NSD 40. According to an example embodiment, the DOC 50 and the DPF-SCR 70 are positioned relative to the HCSD 30 and NSD 40 (e.g., closely coupled, etc.) such that the DOC 50 and the DPF-SCR 70 may effectively treat the HC and the NOx released from the HCSD 30 and NSD 40, respectively.

The DOC 50 may have any of various flow-through designs. Generally, the DOC 50 is structured to oxidize at least some particulate matter, e.g., the soluble organic fraction of soot, in the exhaust and reduce unburned hydrocarbons and CO in the exhaust to less environmentally harmful compounds. For example, the DOC 50 may be structured to reduce the hydrocarbon and CO concentrations in the exhaust gas to meet the requisite emissions standards for those constituents of the exhaust gas. An indirect consequence of the oxidation capabilities of the DOC 50 may be the ability of the DOC 50 to oxidize portions of NO (e.g., of the exhaust gas, released by the NSD 40, etc.) into $NO_2$. In this manner, the level of $NO_2$ exiting the DOC 50 is equal to the $NO_2$ in the exhaust gas generated by the engine 20 plus the $NO_2$ converted from NO by the DOC 50.

The DPF-SCR 70 may be any of various flow-through or wall-flow designs, and is structured to reduce particulate matter concentrations, e.g., soot and ash, in the exhaust gas to meet or substantially meet requisite emission standards. By having a coating of SCR catalyst applied to the DPF, the DPF-SCR 70 may not only filter particulate matter but also provide or facilitate NOx reduction. Advantageously, this structure and architecture reduces the NOx reduction needed or substantially needed from the SCR catalyst 90 itself. The DPF-SCR 70 is configured to capture particulate matter and other constituents, and thus may need to be periodically regenerated to burn off the captured constituents. Additionally, the DPF-SCR 70 may be configured to oxidize NO to form $NO_2$ independent of the DOC 50, as well as convert HC to $H_2O$ (e.g., HC that may have passed through the DOC 50, etc.).

As shown in FIG. 1, the SCR catalyst 90 is positioned downstream of the DPF-SCR 70. According to an example embodiment, the DPF-SCR 70 is located as close to the engine 20 as feasible, while the SCR catalyst 90 is located further downstream where there is more space available on the engine system 10 or a vehicle including the engine system 10. The SCR catalyst 90 may be any of various catalysts known in the art. For example, in some implementations, the SCR catalyst 90 is a vanadium-based catalyst, and in other implementations, the SCR catalyst 90 is a zeolite-based catalyst, such as a Cu-Zeolite or a Fe-Zeolite catalyst. The SCR catalyst 90 is structured to provide additional SCR catalyst volume to the exhaust aftertreatment system 22. The additional volume may be useful during operating conditions such as at high flow conditions, high NOx flux conditions, and/or high temperature conditions. For example, depending on engine-out conditions, more SCR catalyst volume (i.e., from the SCR catalyst 90) may be advantageous to achieve the desired NOx conversion beyond what the DPF-SCR 70 may be able to provide individually.

As discussed above, the SCR system 60 may include the DEF delivery system 80 (i.e., a reductant delivery system, etc.) with a reductant (e.g., DEF, etc.) source, a pump, and a delivery line, and a delivery mechanism. The reductant source may be a container, a tank, or other type of supply capable of retaining a reductant, such as, for example, ammonia ($NH_3$), urea, diesel oil, or any other suitable DEF alternatives. The reductant source is in reductant supplying communication with the pump, which is configured to pump reductant from the reductant source to the delivery mechanism via a reductant delivery line. In one embodiment, DEF delivery system 80 includes a first delivery line 82 fluidly coupled to the reductant source of the DEF delivery system 80 and configured to provide reductant to a first delivery mechanism, shown as first doser 84. As shown in FIG. 1, the first doser 84 is positioned upstream of the DPF-SCR 70. The first doser 84 may be selectively controlled to facilitate the injection of reductant directly into the exhaust gas stream prior to entering the DPF-SCR 70. As described herein, the controller 150 is structured to control the timing and amount of the reductant delivered to the exhaust gas upstream of the DPF-SCR 70 via the first doser 84. In some embodiments, the DEF delivery system 80 includes a second delivery line 86 fluidly coupled to the reductant source of the DEF delivery system 80 and configured to provide reductant to a second delivery mechanism, shown as second doser 88. As shown in FIG. 1, the second doser 88 is positioned downstream of the DPF-SCR 70 and upstream of the SCR catalyst 90. The second doser 88 may be selectively controlled to facilitate the injection of reductant directly into the exhaust gas stream after exiting the DPF-SCR 70 and prior to entering the SCR catalyst 90. As described herein, the controller 150 is structured to control the timing and amount of the reductant delivered to the exhaust gas downstream of the DPF-SCR 70 and upstream of the SCR catalyst 90 via the second doser 88.

In some embodiments, the reductant is either ammonia or urea (which decomposes to produce ammonia). The ammonia reacts with NOx in the presence of the DPF-SCR 70 and/or the SCR catalyst 90 to reduce the NOx to less harmful emissions, such as $N_2$ and $H_2O$. The NOx in the exhaust gas may include $NO_2$ and/or NO. Generally, both $NO_2$ and NO are reduced to $N_2$ and $H_2O$ through various chemical reactions driven by the catalytic elements of the DPF-SCR 70 and the SCR catalyst 90 in the presence of ammonia.

According to an example embodiment, the SCR catalyst 90 is used to optimize the temperature for SCR reactions. By way of example, since the DPF-SCR 70 is positioned closer to the engine 20, the DPF-SCR 70 may get relatively hot under high load conditions. The increase in temperature may drive the DPF-SCR 70 into a temperature zone where the DPF-SCR 70 may oxidize the reductant (e.g., ammonia, etc.). Since the SCR catalyst 90 is positioned further downstream from the engine 20 in the exhaust aftertreatment system 22, the SCR catalyst 90 may operate at a relatively cooler temperature (i.e., as compared to the DPF-SCR 70). Thus, by switching to the second dosing location (e.g., via the second doser 88, etc.), the SCR catalyst 90 may oxidize a lesser amount of the reductant. This may provide for a more efficient utilization of the reductant injection to further reduce the NOx emissions.

Based on the foregoing, in the illustrated embodiment, the HCSD 30 is positioned at the inlet of the exhaust aftertreatment system 22, upstream of the NSD 40. The NSD 40 is positioned between the HCSD 30 and the DOC 50 (i.e., downstream of the HCSD 30 and upstream of the DOC 50). The DOC 50 is positioned downstream of the NSD 40 and upstream of the DPF-SCR 70. The first doser 84 is positioned between the DOC 50 and the DPF-SCR 70. The SCR catalyst 90 is positioned downstream of the DPF-SCR 70, near the outlet of the exhaust aftertreatment system 22. The second doser 88 is positioned between the DPF-SCR 70 and the SCR catalyst 90 (i.e., upstream of the SCR catalyst 90 and downstream of the DPF-SCR 70). However, in alternative embodiments, other arrangements of the components of the exhaust aftertreatment system 22 are also possible (e.g., components may be omitted, added, rearranged, etc.). In an alternative embodiment, the HCSD 30 and the NSD 40 are omitted. In yet another alternative embodiment, the function of the HCSD 30, the NSD 40, and the DOC 50 is performed by a single catalyst system. In still another alternative embodiment, the DPF-SCR 70 includes two separate elements, a DPF and a SCR catalyst, with or without the HCSD 30 and/or the NSD 40 present in the exhaust aftertreatment system 22. In some alternative embodiments, the SCR catalyst 90 may include one or more catalysts (e.g., two, three, etc.) aligned in a serial manner.

In some embodiments, the exhaust aftertreatment system 22 includes an exhaust gas recirculation (EGR) system, shown as EGR system 100. According to the example embodiment shown in FIG. 1, the EGR system 100 includes an exhaust throttle 102 and low pressure exhaust gas recirculation (LPEGR) piping 104. The LPEGR piping 104 is structured to recirculate exhaust gas back to an intake of the engine 20 from the exhaust aftertreatment system 22. As shown in FIG. 1, the LPEGR piping 104 is positioned downstream of the DPF-SCR 70 and upstream of the SCR catalyst 90. In other embodiments, the LPEGR piping 104 is positioned in any one of a variety of other locations (e.g., upstream of the DPF-SCR 70, downstream of the SCR catalyst 90, etc.). The exhaust throttle 102 is configured to modulate (i.e., control, etc.) the exhaust flow through the exhaust aftertreatment system 22. By way of example, the exhaust throttle 102 may be configured to increase the exhaust flow through the LPEGR piping 104 by closing or actuating towards a closed position. By way of another example, the exhaust throttle 102 may be configured to increase the exhaust flow through the SCR catalyst 90 and out of the exhaust aftertreatment system 22 by opening or actuating towards an open position.

In some embodiments, the exhaust aftertreatment system 22 includes an ammonia oxidation (AMOx) catalyst. The AMOx catalyst may be positioned in various locations along the exhaust aftertreatment system 22. The AMOx catalyst may be any of various flow-through catalysts configured to react with ammonia to produce mainly nitrogen. The AMOx catalyst is structured to remove ammonia that may have slipped through or exited the DPF-SCR 70 and/or the SCR catalyst 90 without reacting with NOx in the exhaust gas. In certain instances, the exhaust aftertreatment system 22 may be operable with or without an AMOx catalyst. Further, although the AMOx catalyst is described as a separate unit from the DPF-SCR 70 and the SCR catalyst 90, in some implementations, the AMOx catalyst may be integrated with the DPF-SCR 70 or the SCR catalyst 90. For example, the AMOx catalyst and the SCR catalyst 90 may be located within the same housing.

In an exhaust flow direction, as indicated by directional arrow 29, exhaust gas flows from the engine 20 to an ambient environment through exhaust piping of the exhaust aftertreatment system 22. As indicated by direction arrow 29, the exhaust gas from the engine 20 flows into an inlet piping section 24 (e.g., headers, downpipes, tubes, conduit, etc.) of exhaust piping of the exhaust aftertreatment system 22. From the inlet piping section 24, the exhaust gas flows into the HCSD 30 and exits the HCSD 30 into the NSD 40. The exhaust gas flows through the NSD 40 into the DOC 50. The exhaust gas exits the DOC 50 into a first mid-pipe section 26A of the exhaust piping of the exhaust aftertreatment system 22. From the first mid-pipe section 26A, the exhaust gas flows into the DPF-SCR 70 and exits the DPF-SCR 70 into a second mid-pipe section 26B of the exhaust piping of the exhaust aftertreatment system 22. From the second mid-pipe section 26B, the exhaust gas flows into the SCR catalyst 90 and exits the SCR catalyst 90 into outlet piping section 28 (e.g., tailpipe, muffler, etc.) of the exhaust piping before the exhaust gas is expelled from the exhaust aftertreatment system 22 (e.g., into an ambient environment, etc.).

By way of example, as the exhaust gas flows through the first mid-pipe section 26A of the exhaust piping, it may periodically be dosed with reductant by the first doser 84. Accordingly, the first mid-pipe section 26A of the exhaust piping may act as a decomposition chamber or tube to facilitate the decomposition of the reductant (e.g., urea, etc.) to ammonia (e.g., if the reductant is urea, etc.). By way of another example, as the exhaust gas flows through the second mid-pipe section 26B of the exhaust piping, it may periodically be dosed with reductant by the second doser 88. Accordingly, the second mid-pipe section 26B of the exhaust piping may act as a decomposition chamber or tube to facilitate the decomposition of the reductant (e.g., urea, etc.) to ammonia (e.g., if the reductant is urea, etc.).

Referring still to FIG. 1, the exhaust aftertreatment system 22 may include various sensors, such as NOx sensors, temperature sensors, and/or reductant sensors. The various sensors may be strategically disposed throughout the exhaust aftertreatment system 22 and may be in communication with the controller 150 to monitor operating conditions of the exhaust aftertreatment system 22. As shown in FIG. 1, the exhaust aftertreatment system 22 includes a first NOx sensor (e.g., an engine out NOx sensor, etc.), shown as inlet NOx sensor 12, and a second NOx sensor (e.g., system out NOx sensor, tailpipe NOx sensor, etc.), shown as outlet NOx sensor 14. The inlet NOx sensor 12 is positioned along the inlet piping section 24 of the exhaust piping of the exhaust aftertreatment system 22. According to an example embodiment, the inlet NOx sensor 12 is configured to acquire NOx data indicative of an amount of NOx within the exhaust gas exiting from the engine 20 (e.g., engine outlet NOx data, etc.) and entering into the exhaust aftertreatment system 22 through the inlet piping section 24. The outlet NOx sensor 14 is positioned along the outlet piping section 28 of the exhaust piping of the exhaust aftertreatment system 22, downstream of the SCR catalyst 90. According to an example embodiment, the outlet NOx sensor 14 is configured to acquire NOx data indicative of an amount of NOx of the exhaust gas exiting from the SCR catalyst 90 (e.g., aftertreatment outlet NOx data, etc.) through the outlet piping section 28 of the exhaust piping of the exhaust aftertreatment system 22 into an ambient environment (e.g., an outside environment, an environment external to the engine system 10, etc.).

In an alternative embodiment, the inlet NOx sensor 12 is positioned along the first mid-pipe section 26A between the DOC 50 and the DPF-SCR 70, and configured to acquire NOx data indicative of an inlet amount of NOx entering the DPF-SCR 70. In some embodiments, the exhaust aftertreatment system 22 includes additional NOx sensors (e.g., in addition to the inlet NOx sensor 12 and the outlet NOx sensor 14, etc.) configured to acquire NOx data at different sections of the exhaust piping and/or between different components of the exhaust aftertreatment system 22. Due to the DOC 50 and/or the DPF-SCR 70 potentially oxidizing some portion of the amount of NOx exiting from the engine 20 (e.g., NO, etc.), the proportions of the amount of NOx exiting from the engine 20 (e.g., NO, $NO_2$, etc.) may not be equal to the proportions of the amount of NOx entering the DPF-SCR 70 and/or the SCR catalyst 90. For example, NO may be oxidized to $NO_2$ in the DOC 50 and/or DPF-SCR 70 such that the relative proportions of NO, $NO_2$, etc. may not be equal to the original proportions from the engine 20. Therefore, it may be beneficial to acquire NOx data at the inlet of the DPF-SCR 70 and/or the SCR catalyst 90. By way of example, the exhaust aftertreatment system 22 may include a third NOx sensor positioned along the first mid-pipe section 26A between the DOC 50 and the DPF-SCR 70, and configured to acquire NOx data indicative of an inlet amount of NOx of the exhaust gas entering the DPF-SCR 70. By way of another example, the exhaust aftertreatment system 22 may include a fourth NOx sensor positioned along the second mid-pipe section 26B between the DPF-SCR 70 and the SCR catalyst 90, and configured to acquire NOx data indicative of an inlet amount of NOx of the exhaust gas entering the SCR catalyst 90. Therefore, the amount of NOx within the exhaust gas at various locations of the exhaust aftertreatment system 22, and/or the amount of NOx converted (e.g., decomposed, etc.) during chemical reactions within the DPF-SCR 70 and/or SCR catalyst 90 may be monitored by the controller 150.

As shown in FIG. 1, the exhaust aftertreatment system 22 includes a first temperature sensor, shown as engine outlet temperature sensor 13, a second temperature sensor, shown as DPF-SCR inlet temperature sensor 15, and a third temperature sensor, shown as SCR inlet temperature sensor 17. The engine outlet temperature sensor 13 is positioned along the inlet piping section 24 of the exhaust piping of the exhaust aftertreatment system 22. According to an example embodiment, the engine outlet temperature sensor 13 is configured to acquire temperature data indicative of a temperature of the exhaust gas exiting from the engine 20 and entering into the exhaust aftertreatment system 22 through the inlet piping section 24. As shown in FIG. 1, the DPF-SCR inlet temperature sensor 15 is positioned along the first mid-pipe section 26A of the exhaust piping of the exhaust aftertreatment system 22. According to an example embodiment, the DPF-SCR inlet temperature sensor 15 is configured to acquire temperature data indicative of a temperature of the exhaust gas entering the DPF-SCR 70. As shown in FIG. 1, SCR inlet temperature sensor 17 is positioned along the second mid-pipe section 26B of the exhaust piping of the exhaust aftertreatment system 22. According to an example embodiment, the SCR inlet temperature sensor 17 is configured to acquire temperature data indicative of a temperature of the exhaust gas entering the SCR catalyst 90.

In some embodiments, the exhaust aftertreatment system 22 includes additional temperature sensors configured to acquire temperature data at different sections of the exhaust piping of the exhaust aftertreatment system 22. For example, temperature sensors may be positioned along the outlet piping section 28 of the exhaust piping and/or in-between at least two of the HCSD 30, the NSD 40, and the DOC 50. By way of example, temperature sensors may be strategically positioned before and after any component within the exhaust aftertreatment system 22 such that the temperature of the exhaust gas flowing into and out of any component may be detected and communicably transmitted to the controller 150.

As shown in FIG. 1, the exhaust aftertreatment system 22 includes a reductant sensor, shown as reductant sensor 76. The reductant sensor 76 is positioned along the second mid-pipe section 26B of the exhaust piping of the exhaust aftertreatment system 22, downstream of the second doser 88. According to an example embodiment, the reductant sensor 76 is configured to acquire reductant data indicative of an amount of reductant within the exhaust gas downstream of the DPF-SCR 70 and the second doser 88, and upstream of the SCR catalyst 90.

In alternative embodiments, the exhaust aftertreatment system 22 does not include the reductant sensor 76. In some embodiments, the exhaust aftertreatment system 22 includes additional reductant sensor and/or the reductant sensor 76 is positioned in a different location of the exhaust aftertreatment system 22. By way of example, a reductant sensor may be positioned near the inlet of the DPF-SCR 70 downstream of the first doser 84 and configured to acquire reductant data indicative of an amount of reductant injected in to the exhaust gas by the first doser 84 and entering the DPF-SCR 70. By way of another example, a reductant sensor may be positioned near the outlet of the DPF-SCR 70 upstream of the second doser 88 and configured to acquire reductant data indicative of an amount of reductant in the exhaust gas after flowing through the DPF-SCR 70. By way of yet another example, a reductant sensor may be positioned downstream of the SCR catalyst 90 and configured to acquire reductant data indicative of an amount of reductant in the exhaust gas after flowing through the SCR catalyst 90. Therefore, the amount of reductant injected by at least one of the first doser 84 and the second doser 88, and/or the amount of reductant decomposed during chemical reactions with NOx and other exhaust gas constituents within the DPF-SCR 70 and/or SCR catalyst 90 may be monitored by the controller 150.

In some embodiments, the exhaust aftertreatment system 22 includes one or more particulate matter (PM) sensors configured to acquire data indicative of an amount of particulate matter flowing through the exhaust aftertreatment system 22. The PM sensors may be strategically positioned before and/or after any component within the exhaust aftertreatment system 22 such that the particulate matter of the exhaust gas flowing into and out of any component may be detected and communicably transmitted to the controller 150. In some embodiments, the engine 20 includes various sensors configured to acquire engine operation data. The various sensors of the engine 20 may be in communication with the controller 150 such that the controller 150 may monitor operating conditions of the engine 20 indicated by the engine operation data. By way of example, the engine 20 may include a speed sensor, a torque sensor, and/or a flow sensor configured to acquire data indicative of engine speed, engine torque, and exhaust flow characteristics.

In other embodiments, a virtual NOx sensor, a virtual reductant sensor, or any other virtual sensor is used instead of actual physical sensor at the locations shown in FIG. 1. While FIG. 1 depicts a several NOx sensors (and reductant sensors, temperature sensors, etc.), it should be understood that one or more of these NOx sensors (or reductant sensors, temperature sensors, etc.) may be replaced by virtual sensor in other embodiments. In this regard, the NOx amount (reductant amount, temperature, etc.) at various locations may be estimated, determined, or otherwise correlated with various operating conditions of the engine 20 and exhaust aftertreatment system 22. For example, based on the engine speed, throttle position, ambient air temperature, and intake mass air flow, an indicative amount of NOx exiting the engine 20 may be determined. The determination may utilize a look-up table that correlates various operating conditions with expected NOx amounts, which can be based on data determined during testing. The determination may also utilize any of a model, formula, equation, process, and the like to otherwise determine a NOx amount at a various location without the use of a physical sensor. This embodiment may be beneficial in exhaust aftertreatment system architectures that are positioned in rather tight spaces, such that the electrical circuitry otherwise used to power and establish a communication protocol with the physical sensors may be eliminated. Further, this embodiment may be beneficial from the standpoint that the need to replace faulty sensors may be substantially avoided. In turn, an operator may realize a rather higher uptime for the system than downtime (e.g., in a repair shop, etc.).

FIG. 1 is also shown to include an operator input/output (I/O) device 120. The operator I/O device 120 is communicably coupled to the controller 150, such that information may be exchanged between the controller 150 and the I/O device 120. The information may relate to one or more components of FIG. 1 or determinations (described below) of the controller 150. The operator I/O device 120 enables an operator of the engine system 10 to communicate with the controller 150 and one or more components of the engine system 10 of FIG. 1. For example, the operator input/output device 120 may include, but is not limited to, an interactive display, a touchscreen device, one or more buttons and switches, voice command receivers, etc. In some embodiments, the controller 150 and components described herein may be implemented with non-vehicular applications (e.g., a power generator, etc.). Accordingly, the operator I/O device 120 may be specific to those applications. For example, in those instances, the operator I/O device 120 may include a laptop computer, a tablet computer, a desktop computer, a phone, a watch, a personal digital assistant, etc. Via the I/O device 120, the controller 150 may provide a fault or service notification based on the determined state of the SCR catalyst 90 and the DPF-SCR 70.

The controller 150 is structured to control the operation of the engine system 10 and associated sub-systems, such as the internal combustion engine 20 and the exhaust aftertreatment system 22. According to one embodiment, the components of FIG. 1 are embodied in a vehicle. The vehicle may include an on-road or an off-road vehicle including, but not limited to, line-haul trucks, mid-range trucks (e.g., pick-up trucks), cars, boats, tanks, airplanes, and any other type of vehicle that utilizes an exhaust aftertreatment system. In various alternate embodiments, as described above, the controller 150 may be used with any engine-exhaust aftertreatment system (e.g., a stationary power generation system, etc.). Communication between and among the components may be via any number of wired or wireless connections (e.g., any standard under IEEE 802, etc.). For example, a wired connection may include a serial cable, a fiber optic cable, a CAT5 cable, or any other form of wired connection. In comparison, a wireless connection may include the Internet, Wi-Fi, cellular, Bluetooth, Zigbee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

Because the controller 150 is communicably coupled to the systems and components of FIG. 1, the controller 150 is structured to receive engine operation data and/or exhaust aftertreatment system operation data from one or more sensors shown in FIG. 1. For example, the exhaust aftertreatment system operation data may include NOx data (e.g., engine out NOx data from the inlet NOx sensor 12, aftertreatment outlet NOx data from the outlet NOx sensor 14, etc.), reductant data (e.g., timing and amount of reductant injected into the exhaust gas from the first doser 84 and/or the second doser 88, etc.), and temperature data (e.g., temperature of the exhaust flow at various locations from the first, second, and/or third temperature sensors 13, 15, 17, etc.). The engine operation data may include engine speed, vehicle speed, engine temperature, engine torque, engine power, exhaust flow, etc. received via one or more sensors.

As the components of FIG. 1 are shown to be embodied in an engine system 10, in one embodiment the controller 150 may be embodied as add-on to an electronic control module (ECM). In some embodiments, the controller 150 may be a stand-alone tool that performs all required data logging, data tracking, data analysis, etc. needed to diagnose the SCR system 60. In some embodiments, the controller 150 is included in the ECM of a vehicle. The ECM may include a transmission control unit and any other vehicle control unit (e.g., exhaust aftertreatment control unit, powertrain control module, engine control module, etc.). In an alternative embodiment, the controller 150 is web based, server based, and/or application based (e.g., a smartphone app, a controller on the internet, etc.). The structure and function of the controller 150 is further described in regard to FIG. 2.

Figure 2:
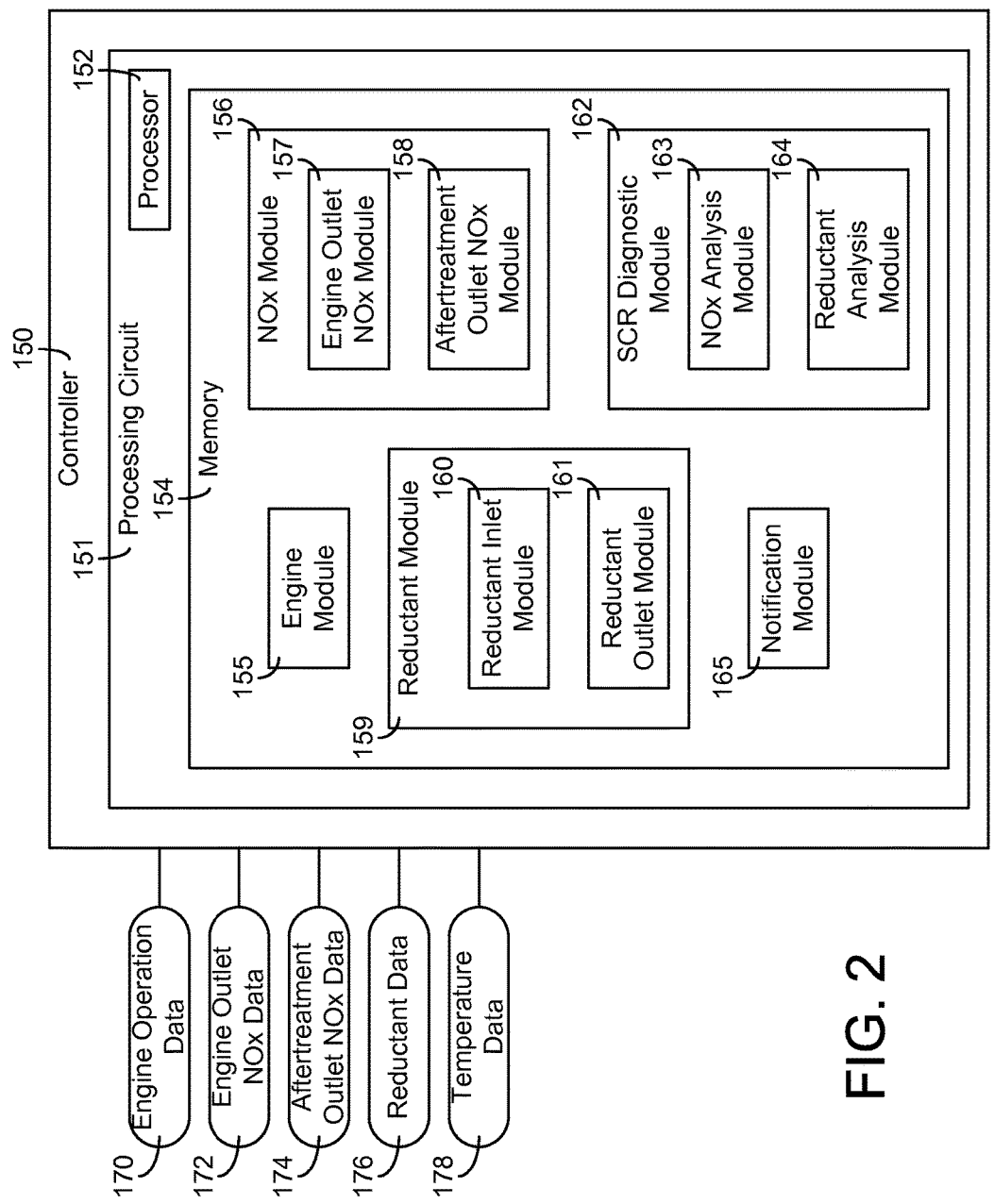
FIG. 2 is a schematic diagram of the controller used with the system of FIG. 1, according to an example embodiment.

As such, referring now to FIG. 2, an example structure for the controller 150 is shown according to one embodiment.

As shown, the controller 150 includes a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes an engine module 155, a NOx module 156, a reductant module 159, a SCR system diagnostic module 162, and a notification module 165. The modules are structured to determine a NOx conversion efficiency fault and diagnose one or more components of the SCR system 60 faulty; more specifically, isolate the failure to at least one of the DPF-SCR 70 and the SCR catalyst 90. Faulty can mean that replacement of a component (e.g., the DPF-SCR 70, the SCR catalyst 90, etc.) is necessary. Faulty can also mean that the component should be checked. In practicality, faulty can mean a check engine light on the dashboard, a notification to a remote interface, etc. While various modules with particular functionality are shown in FIG. 2, it should be understood that the controller 150 and memory 154 may include any number of modules for completing the functions described herein. For example, the activities of multiple modules may be combined as a single module, additional modules with additional functionality may be included, etc. Further, it should be understood that the controller 150 may further control other vehicle activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The engine module 155 is structured to receive engine operation data 170 (e.g., from one or more sensors of the engine 20, from a virtual sensor, etc.). In this regard and in one embodiment, the engine module 155 may include the engine 20 and any sensor operatively coupled to the engine 20. In other embodiments, the engine module 155 may only include the sensor(s) communicably coupled to the engine 20. In further embodiments, the engine module 155 may include communication circuitry for obtaining and/or receiving the engine data 170 from one or more virtual and/or physical sensors of the engine 20. The engine operation data 170 may include, but is not limited to, a vehicle speed, an engine speed, an engine torque, an engine power, an exhaust flow characteristic, and the like. The engine operation data 170 may be stored within the engine module 155 for further use by other modules of the controller 150. In some embodiments, the engine module 155 is further structured to provide an engine operation command (e.g., instruction, etc.) to the engine 20. The engine operation command may be configured to adjust or perturb an amount of NOx out of the engine 20 (e.g., during an intrusive diagnostic test, during a passive diagnostic test, etc.). Adjusting the amount NOx in the exhaust flow may allow for the test to be run at multiple testing states or with a sufficient amount of NOx to accurately perform the diagnostic test. Adjusting the engine operation command may include, but is not limited to, an exhaust gas recirculation (EGR) flow amount adjustment, an ignition timing adjustment, an engine speed adjustment, fuel injection timing adjustment, fuel injection pressure adjustment, a fuel injection amount adjustment, an air flow amount, a number of fuel injection pulses, a fuel flow amount, and an engine torque output, among other alternatives. The engine operation commands may be provided individually or with other commands. The extent to which any of the aforementioned engine operation commands may be used and in what combination may vary based on engine design, engine application, or type of diagnostic test (e.g., passive, intrusive, etc.).

The engine operation command from the engine module 155 may include a command to actuate the exhaust throttle 102 (e.g., open, close, etc.) to adjust the EGR flow from the exhaust aftertreatment system 22 to an intake of the engine 20 through the LPEGR piping 104. EGR is an emission control technology allowing substantial decreases in NOx emissions when the EGR flow is increased (e.g., the exhaust throttle 102 is actuated towards a closed position, etc.), and substantial increases when the EGR flow is decreased or stopped (e.g., the exhaust throttle 102 is actuated towards an open position, etc.). Essentially, the amount of NOx decreases as the EGR rate increases. Also, NOx reduction at a given EGR rate increases as the engine load may become higher. For example, a given decrease in NOx emissions may require less EGR at high loads (e.g., high engine torque, etc.) than at low loads (e.g., low engine torque, etc.).

The engine operation command from the engine module 155 may adjust injection pressure. An increase in the fuel injection pressure may result in an increase in the NOx emissions at medium and at high engine loads (e.g., mid-to-high engine torque, etc.), while a decrease in the fuel injection pressure may decrease the NOx emissions. Multi-pulse injection may be used to lengthen the combustion event, thus increasing the amount of heat is the system, thereby facilitating the generation of greater amounts of NOx emissions. In some embodiments, engine brakes may be used to increase the load on the engine 20 or a variable geometry turbocharger (VGT) may also be used to increase load and flow by building exhaust backpressure. Greater engine load may increase the NOx emissions.

The ignition timing adjustment command may include at least one of an advance to ignition timing and a retarding to ignition timing. In a compression-ignition engine, ignition timing adjustment refers to when fuel is injected into a combustion chamber. In comparison, ignition timing adjustment in a spark-ignition engine refers to when a spark is commanded. Thus, when the controller 150 is embodied with a compression-ignition engine, the engine module 155 may provide a command to a fuel injector (including a solenoid or other fuel injector driver and the components related to the fuel injector, such as a common rail) to adjust when fuel is injected into the combustion chamber. When the controller 150 is embodied in a spark-ignition engine, the engine module 155 may provide a command to a spark plug or igniter (including any spark plug or igniter drivers, such as a solenoid or a transformer for a power supply) to adjust when the spark event is initiated. Accordingly, while the description below is substantially in regard to compression-ignition engines (e.g., fuel injectors), it should be understood that similar commands may be provided with spark-ignition commands such that all such variations fall within the spirit and scope of the present disclosure.

Therefore, as mentioned above, the engine module 155 may provide an ignition timing adjustment command that includes at least one of retarding and advancing ignition timing. The timing may be adjusted to increase or decrease the NOx production of the engine 20. Advancing the ignition timing refers to commanding fuel injection relatively earlier than it otherwise would occur. In comparison, retarding ignition timing refers to delaying a fuel injection event. For example, if the ignition timing of an engine is set to nine degrees before top dead center (BTDC) and is adjusted to twelve degrees BTDC, the ignition timing is advanced. Proper ignition timing may be critical for optimum performance, fuel economy, and emissions. Advancing ignition timing may result in increases to both the temperature and pressure within the engine cylinders. Because NOx formation tends to occur at relatively higher combustion temperatures, the NOx amount out of the engine may increase due to this command. In comparison, retarding ignition timing may result in lower temperature and pressures within the combustion cylinder. As a result, a relatively smaller amount of NOx out of the engine may occur. Thus, the engine module 155 may provide one or more commands to adjust the ignition timing, which results in a change in a NOx amount out of the engine and excites the amount of NOx within the exhaust gas.

As mentioned above, the engine operation command from the engine module 155 may also include an adjustment to engine speed (i.e., revolutions-per-minute (RPM)). By increasing the engine speed, the average temperature of the engine cylinders may rise as heat is spread relatively more rapidly throughout the combustion chamber. Over time, the average temperature in the cylinder rises. Therefore, because NOx production is highly dependent on high temperature, by increasing engine speed, the engine out NOx amount exhaust may increase. On the other hand, decreasing engine speed may have the opposite effect. As such, the temperature may decrease and in turn, the engine out amount of NOx may decrease. Increasing the engine speed demands a significant increase to the indicated torque and fuel flow to the engine 20, which may increase NOx production. Further, the increased flow through the engine provides a wider operating space to adjust the engine operation commands, allowing the possibility for finding a combination of engine operation commands that provides a higher NOx concentration than is possible at a lower speed.

Thus, the engine module 155 may provide one or more commands that are structured to excite (e.g., increase or decrease) an engine out NOx amount. As such, multiple engine commands may be used simultaneously to affect an increase or decrease in the NOx emissions of the engine 20. However, it should be understood that other parameters may also be controlled by the engine module 155.

As shown in FIG. 2, the NOx module 156 includes an engine outlet NOx module 157 and an aftertreatment outlet NOx module 158. The engine outlet NOx module 157 is structured to receive and store engine outlet NOx data 172 indicative of an amount of NOx exiting the engine 20. Therefore, the engine outlet NOx module 157 may be communicably coupled with the inlet NOx sensor 12. In other embodiments, the NOx module 156 may include the NOx sensor 12 (or a virtual sensor for determining an indicative amount of engine out NOx). The aftertreatment outlet NOx module 158 is structured to receive and store aftertreatment outlet NOx data 174 indicative of an amount of NOx exiting the SCR catalyst 90 (e.g., an actual/measured amount of NOx downstream of the SCR catalyst 90, etc.). Therefore, the aftertreatment outlet NOx module 158 may be communicably coupled with the outlet NOx sensor 14. The NOx module 156 is structured to interpret the engine outlet NOx data 172 and the aftertreatment outlet NOx data 174 to determine whether a NOx conversion efficiency fault is present based on NOx conversion efficiency for the SCR system 60. The NOx module 156 may determine the NOx conversion efficiency fault on an instantaneous or a cumulative basis to determine if the exhaust aftertreatment system 22 is operating nominally.

The reductant module 159 is structured to provide a dosing command to a reductant doser, such as the first doser 84 and the second doser 88, to control an amount of reductant injected into the exhaust flow. In this regard and in some embodiments, the reductant module 159 may include the reductant doser while in other embodiments the reductant module 159 may include communication circuitry for communicating with the doser. The dosing command may include at least one of a command to suspend reductant dosing injection by one of the dosers into the exhaust flow and a command to increase, decrease, or maintain a reductant dosing injection by one of the dosers into the exhaust flow. The reductant module 159 is further structured to provide a command to control the injection location of the reductant into the exhaust flow (e.g., upstream of the DPF-SCR 70, downstream of the DPF-SCR 70, etc.). According to an example embodiment, the reductant module 159 provides the dosing command to one of the first doser 84 and the second doser 88 at a time (i.e., only one of the first doser 84 and the second doser 88 inject reductant into the exhaust flow at a time, etc.). Reductant dosing may be used by the reductant module 159 to decreases the levels of NOx in the exhaust gas. According to an example embodiment, the reductant module 159 is structured to provide the dosing commands to maintain NOx conversion efficiency requirements of the exhaust aftertreatment system 22 (e.g., based on efficiency regulations, laws, etc.) while reducing the amount of reductant consumed to maintain the NOx conversion efficiency requirements (e.g., optimizing the total consumption of reductant, etc.). In one embodiment, the reductant module 159 provides the dosing command to the first doser 84 to inject reductant upstream of the DPF-SCR 70 such that the exhaust aftertreatment system 22 relies more on the DPF-SCR 70 for NOx conversion. In another embodiment, the reductant module 159 provides the dosing command to the second doser 88 to inject reductant downstream of the DPF-SCR 70 such that the exhaust aftertreatment system 22 relies more on the SCR catalyst 90 for NOx conversion.

Reductant oxidation does not aid in the NOx conversion and is a function of the temperature of the SCR system 60. The dosing commands provided to the first and second dosers 84 and 88 are based on monitoring the temperatures of the DPF-SCR 70 and SCR catalyst 90 indicated by temperature data 178, as well as other operating characteristics regarding the engine 20 and/or the exhaust aftertreatment system 22 (e.g., the engine operation data 170, the engine outlet NOx data 172, the aftertreatment outlet NOx data 174, etc.). The temperature of the exhaust flow throughout the exhaust aftertreatment system 22 may directly affect which of the first doser 84 and the second doser 88 the reductant module 159 provides the dosing command to. Therefore, the reductant module 159 may be communicably coupled with at least one of the engine outlet temperature sensor 13, the DPF-SCR inlet temperature sensor 15, and the SCR inlet temperature sensor 17. The reductant module 159 is further structured to receive the temperature data 178 indicative of a temperature of the exhaust flow at various locations of the exhaust aftertreatment system 22 including at least one of a temperature at the outlet of the engine 20 (e.g., from the engine outlet temperature sensor 13, etc.), a temperature at the inlet of the DPF-SCR 70 (e.g., from the DPF-SCR inlet temperature sensor 15, etc.), and a temperature at the inlet of the SCR catalyst 90 (e.g., from the SCR inlet temperature sensor 17, etc.).

Figure 3:
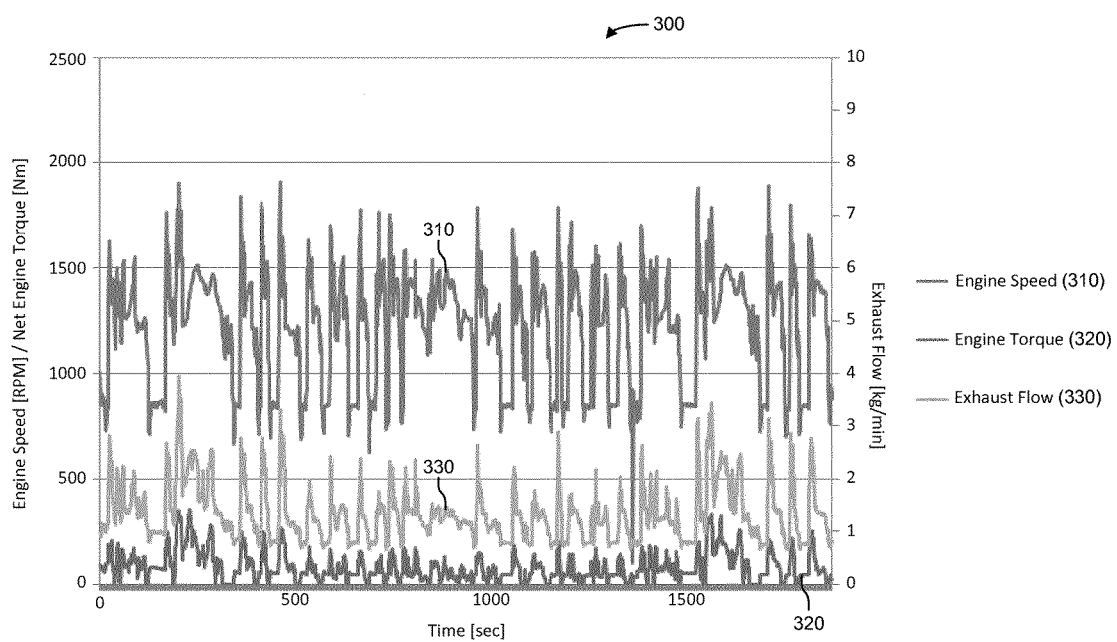
FIG. 3 is a graph of certain operating characteristics of an engine over time, according to an example embodiment.
Figure 4:
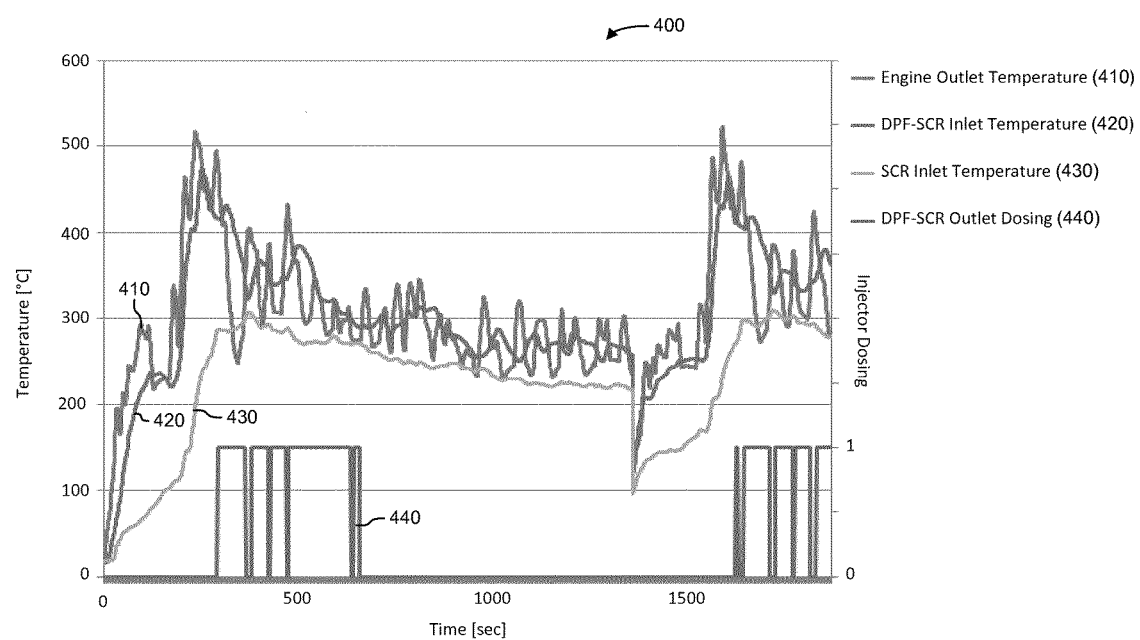
FIG. 4 is a graph of certain operating characteristics of an exhaust aftertreatment system over time, according to an example embodiment.

Referring now to FIGS. 3-4, engine operating characteristics and exhaust aftertreatment system operating characteristics are shown according to an example embodiment. As shown in FIG. 3, an engine operating characteristics graph 300 illustrates operating characteristic of the engine 20 during an example operation of the engine system 10. The operating characteristics of the engine 20 include, but are not limited to, engine speed 310, engine torque 320, and exhaust flow 330. As shown in FIG. 4, an exhaust aftertreatment system operating characteristics graph 400 corresponding to the engine operating characteristics graph 300 illustrates operating characteristics of the exhaust aftertreatment system 22 during the example operation of the engine system 10. The operating characteristics of the exhaust aftertreatment system 22 include, but are not limited to, engine outlet temperature 410, DPF-SCR inlet temperature 420, SCR catalyst inlet temperature 430, and DPF-SCR outlet dosing 440. As shown in FIGS. 3-4, as the operating characteristics of the engine 20 fluctuate (e.g., during operation of the engine, etc.), the temperature of the exhaust at various locations of the exhaust aftertreatment system 22 vary, as well as which of the reductant dosers (e.g., the first doser 84, the second doser 88, etc.) provides the reductant injection into the exhaust flow.

Referring to FIGS. 2 and 4, as the DPF-SCR inlet temperature 420 increases above a threshold temperature (e.g., approximately 450° C., etc.), the reductant module 159 provides a dosing command to the second doser 88 downstream of the DPF-SCR 70 as indicated by the DPF-SCR outlet dosing 440 (i.e., when the DPF-SCR outlet dosing 440 is at a value of 1, the reductant module 159 provides a dosing command to the second doser 88; when the DPF-SCR outlet dosing 440 is at a value of 0, the reductant module 159 provides a dosing command to the first doser 84; etc.). Therefore, according to the example embodiment shown in FIG. 4, the reductant module 159 is structured to provide the dosing command to the second doser 88 when the DPF-SCR 70 operates at a temperature above the temperature threshold, and provide the dosing command to the first doser 84 when the DPF-SCR 70 operates at a temperature below the temperature threshold.

Referring back to FIG. 2, the reductant module 159 includes a reductant inlet module 160 and a reductant outlet module 161. The reductant inlet module 160 may be communicably coupled to the first doser 84 and the second doser 88. The reductant inlet module 160 is configured to acquire and store reductant data 176 indicative of an amount of reductant injected into the exhaust flow. Therefore, the reductant inlet module 160 may be communicably coupled to a flow sensor structured to monitor the amount of reductant injected by the first doser 84 and/or the second doser 88 or otherwise determine the amount of reductant injected (e.g., based on the dosing command, based on the amount of reductant measured by a reductant sensor, etc.). The reductant outlet module 161 is structured to receive and store reductant data 176 indicative of an actual/measured amount of reductant exiting the DPF-SCR 70 (i.e., downstream of the DPF-SCR 70, etc.). Therefore, the reductant outlet module 161 may be communicably coupled with the reductant sensor 76.

The SCR system diagnostic module 162 is structured to determine at least one of the DPF-SCR 70 and the SCR catalyst 90 are faulty in response to the NOx module 156 determining that the exhaust aftertreatment system 22 is experiencing the NOx conversion efficiency fault. The SCR system diagnostic module 162 may be communicably coupled to the various modules of the controller 150. Therefore, the SCR system diagnostic module 162 is structured to receive and interpret operating characteristics of the engine 20 indicated by the engine operation data 170 and operating characteristics of the exhaust aftertreatment system 22 indicated by at least one of the engine outlet NOx data 172, the aftertreatment outlet NOx data 174, the reductant data 176, and the temperature data 178. As shown in FIG. 2, the SCR system diagnostic module 162 includes a NOx analysis module 163 and a reductant analysis module 164. The NOx analysis module 163 is structured to determine whether the DPF-SCR 70 and/or the SCR catalyst 90 is faulty, while the reductant analysis module is structured to determine whether the DPF-SCR 70 is faulty.

According to an example embodiment, the NOx analysis module 163 is structured to receive the aftertreatment outlet NOx data 174 indicative a NOx conversion value. The NOx conversion value is based on an actual amount of NOx entering the exhaust aftertreatment system 22 and an actual amount of NOx downstream of the SCR catalyst 90 exiting the exhaust aftertreatment system 22. The NOx analysis module 163 is further structured to determine an expected NOx conversion value based on the actual amount of NOx entering the exhaust aftertreatment system 22 and an expected amount of NOx of the exhaust flow downstream of (i.e., exiting, etc.) the SCR catalyst 90. The expected amount of NOx downstream of the SCR catalyst 90 may be determined based on at least one of the operating characteristics of the engine 20 (e.g., exhaust flow, engine speed, etc.) and the operating characteristics of the exhaust aftertreatment system 22 (e.g., the temperature of the exhaust flow at various locations, the amount of reductant injected into the system, the amount of NOx exiting entering the exhaust aftertreatment system 22, etc.). In one embodiment, the determination of the expected amount of NOx downstream of the SCR catalyst 90 is determined and the actual amount of NOx is measured (e.g., via the inlet NOx sensor, the outlet NOx sensor 14, etc.) when the reductant is injected into the exhaust flow downstream of the DPF-SCR 70 and upstream of the SCR catalyst 90 by the second doser 88. The determination of whether the SCR catalyst 90 is faulty may be substantially easier and more accurate when the SCR catalyst 90 performs most of the NOx conversion. As indicated above, the reductant module 159 may inject the reductant via the second doser 88 when the exhaust aftertreatment system 22 relies more on the SCR catalyst 90 for NOx conversion.

The NOx analysis module 163 is further structured to compare the actual NOx conversion value (i.e., the actual amount of NOx downstream of the SCR catalyst 90, etc.) to at least one of the expected NOx conversion value (i.e., the expected amount of NOx downstream of the SCR catalyst 90, etc.) and a threshold value of NOx to determine whether the underfloor SCR catalyst 90 is the component or the primary component of the SCR system 60 causing the NOx conversion efficiency fault. The threshold value of NOx may be preset within the NOx analysis module 163 and may be based on the respective aftertreatment system 22 architecture and components and/or engine 20. The NOx analysis module 163 is structured to determine that the SCR catalyst 90 is faulty in response to at least one of the actual NOx conversion value across the SCR catalyst 90 differing from the expected NOx conversion value across the SCR catalyst 90 greater than a threshold amount (i.e. the actual NOx amount downstream of the SCR catalyst 90 differing from the expected amount of NOx downstream of the SCR catalyst 90 greater than a threshold NOx difference, etc.) and the actual NOx amount of NOx downstream of the SCR catalyst 90 being greater than the threshold value of NOx. Conversely, if the NOx module 157 determines that the SCR system 60 is experiencing a NOx conversion efficiency fault, and the NOx analysis module 163 determines that the SCR catalyst 90 is not faulty (e.g., the actual NOx conversion value across the SCR catalyst 90 differing from the expected NOx conversion value across the SCR catalyst 90 less than the threshold, the actual amount of NOx downstream of the SCR catalyst 90 being less than the threshold value of NOx, etc.), the NOx analysis module 163 is structured to determine that the DPF-SCR 70 is faulty (i.e., the cause of the NOx conversion efficiency fault of the SCR system 60). The reductant analysis module 164 may be structured to verify (e.g., provide supplementary confirmation, etc.) that the DPF-SCR 70 is in-fact faulty, which is described more fully herein. The threshold NOx difference may be a magnitude difference, a percentage difference, or the like between the actual amount of NOx and the expected amount of NOx. The notification module 165 is structured to provide an alert or notification to an operator (e.g., an driver, a technician, etc.) via the operator I/O device 120 that the SCR catalyst 90 may be faulty responsive to the NOx conversion efficiently fault and at least one of the threshold NOx difference and the threshold value of NOx being exceeded.

According to another embodiment, the NOx analysis module 163 is structured to construct a map and/or a table of expected NOx conversion efficiency based on the engine out NOx amount, aftertreatment temperatures, exhaust flow characteristics, and/or any other information from the engine 20 and/or the exhaust aftertreatment system 22. In one embodiment, the map and/or table may be created to include multiple operating points of the engine 20 and the exhaust aftertreatment system 22. In another embodiment, the map and/or table include a narrower region of operation where the information from inlet and outlet NOx sensors 12 and 14 are more readily available and a better separation is observed between a healthy and failed SCR system 60. The NOx analysis module 163 may also create multiple maps for different contributions to NOx conversion of the SCR catalyst 90 and/or the DPF-SCR 70 (e.g., based on when exactly the reductant injection is switched between the first doser 84 and the second doser 88, etc.). With multiple maps, the performance of DPF-SCR 70 may also be diagnosed in addition to the SCR catalyst 90. For example, during a NOx and/or an exhaust flow spike, the effect on NOx conversion computed from the inlet and outlet NOx sensors 12 and 14 may be more pronounced for failures in both the DPF-SCR 70 and the SCR catalyst 90 as compared to a failure only in the SCR catalyst 90.

The NOx analysis module 163 may compare the map and/or table of expected NOx conversion efficiency with the computed (i.e., actual, etc.) NOx conversion efficiency from the inlet and outlet NOx sensors 12 and 14 used to detect the conversion fault. In one embodiment, the computed NOx conversion efficiency is lower than the map based efficiency. This may indicate that the SCR catalyst is unhealthy (i.e., faulty, etc.). In another embodiment, the computed NOx conversion efficiency is substantially similar to map based efficiency. This may indicate that the DPF-SCR 70 is unhealthy. In this example embodiment, the reductant sensor 76 may be omitted. The notification module 165 is structured to provide an alert or notification to an operator (e.g., an driver, a technician, etc.) via the operator I/O device 120 that the DPF-SCR 70 and/or the SCR catalyst 90 may be faulty based on the map based efficiency and the computed NOx conversion efficiency. In other embodiments, the notification module 165 may include other functionality, such as derating the engine 20 responsive to a determined faulty component in order to reduce strain on that component until a servicing event can occur. Another action may be for the notification module 165 to cause a regeneration event to burn off soot and other accumulated materials in the exhaust aftertreatment system 22 followed by a re-running of the processes described herein to confirm a faulty determination.

Figure 5:
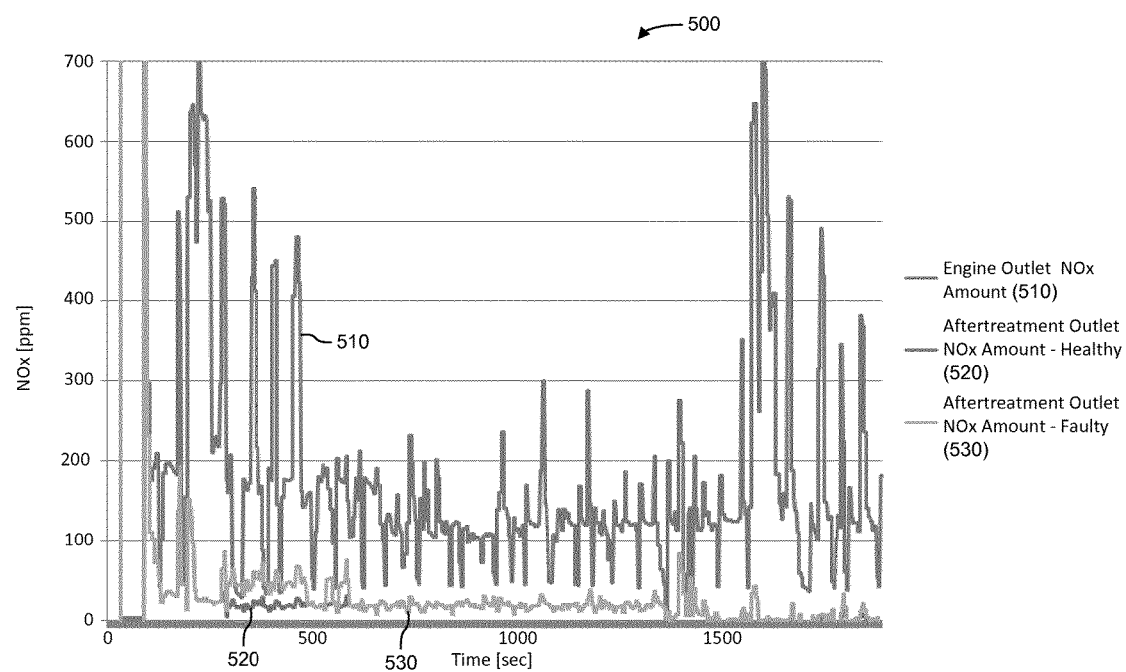
FIG. 5 is a graph comparing an amount of NOx exiting a healthy exhaust aftertreatment system to an amount of NOx exiting a faulty exhaust aftertreatment system, according to an example embodiment.

Referring now to FIG. 5, a NOx graph 500 is shown according to an example embodiment. The NOx graph 500 compares an amount of NOx exiting a healthy exhaust aftertreatment system 22 to an amount of NOx exiting a faulty exhaust aftertreatment system 22. The NOx graph 500 includes an engine outlet NOx amount 510 (e.g., indicated by engine outlet NOx data 172, etc.), an aftertreatment outlet NOx amount 520 for a healthy exhaust aftertreatment system 22 (e.g., the expected amount of NOx downstream of the SCR catalyst 90, etc.), and an aftertreatment outlet NOx amount 530 for a faulty exhaust aftertreatment system 22 (e.g., the actual amount of NOx downstream of the SCR catalyst 90, indicated by the aftertreatment outlet NOx data 174, etc.). FIG. 5 corresponds with FIGS. 3-4. As shown in FIG. 4, at around approximately 300 seconds, the DPF-SCR inlet temperature 420 reaches the temperature threshold such that the reductant module 159 begins injecting reductant into the exhaust aftertreatment system 22 via the second doser 88 (i.e., relying on the SCR catalyst 90 for NOx conversion, etc.). As shown in FIG. 5, the aftertreatment outlet NOx amount 530 for a faulty exhaust aftertreatment system 22 begins to deviate from the aftertreatment outlet NOx amount 520 for a healthy exhaust aftertreatment system 22 at around 300 seconds as well (i.e., the actual amount of NOx differs from the expected amount of NOx by a threshold NOx difference, etc.). Therefore, this indicates that the SCR catalyst 90 is faulty since the SCR catalyst 90 provides the majority of the NOx conversion when the second doser 88 injects the reductant into the exhaust flow (as indicated by the DPF-SCR outlet dosing 440 of FIG. 4). In some embodiments, the controller 150 may deliberately affect the amount of NOx in the exhaust flow with an engine operation command (e.g., EGR flow amount adjustment, an ignition timing adjustment, an engine speed adjustment, fuel injection timing adjustment, fuel injection pressure adjustment, a fuel injection amount adjustment, an air flow amount, a number of fuel injection pulses, a fuel flow amount, and an engine torque output, etc.) to excite the NOx measurements and more easily diagnose a fault with the SCR catalyst 90.

Referring back to FIG. 2, according to an example embodiment, the reductant analysis module 164 is structured to receive the reductant data 176 indicative of a reductant conversion across the DPF-SCR 70 that indicates whether reductant may be slipping across the DPF-SCR 70. During a reductant slip condition, there is an amount of unconverted reductant in the SCR system 60. The amount of reductant slip across the DPF-SCR 70 is based on an actual amount of reductant downstream of (i.e., exiting, etc.) the DPF-SCR 70 and the amount of reductant injected into the exhaust flow (e.g., upstream of the DPF-SCR 70 by the first doser 84, etc.). The reductant analysis module 164 is further structured to determine an expected amount of reductant slip based on the amount of reductant injected into the exhaust flow and an expected amount of reductant of the exhaust flow downstream of the DPF-SCR 70. The expected amount of reductant downstream of the DPF-SCR 70 may be determined based on at least one of the operating characteristics of the engine 20 (e.g., exhaust flow, engine speed, etc.) and the operating characteristics of the exhaust aftertreatment system 22 (e.g., the temperature of the exhaust flow at various locations, the amount of reductant injected into the system upstream of the DPF-SCR 70, the amount of NOx exiting or entering the exhaust aftertreatment system 22, etc.). In one embodiment, the determination of the expected amount of reductant downstream of the DPF-SCR 70 is determined and the actual amount of reductant is measured (e.g., via the reductant sensor 76, etc.) when the reductant is injected into the exhaust flow upstream of the DPF-SCR 70 by the first doser 84. If the DPF-SCR 70 is faulty, under these conditions the reductant sensor 76 may be reading higher than expected reductant amounts due to a loss of catalytic activity of the DPF-SCR 70. The loss of catalytic activity may result in lower ammonia storage and hence higher ammonia slip (i.e., higher amounts of reductant downstream of the DPF-SCR 70 than expected, etc.).

In one embodiment, the reductant analysis module 164 is structured to determine whether the DPF-SCR 70 is faulty. This determination may be made based on the reductant slip value. This determination may also be made prior to the NOx analysis module 163. In other embodiments, the reductant analysis module 164 is structured to confirm (e.g., supplement, verify, etc.) the determination made by the NOx analysis module 163 that, e.g., the DPF-SCR 70 is faulty since the SCR catalyst 90 is not faulty.

In some embodiments, the reductant sensor 76 could be positioned upstream of second doser 88, then the reductant analysis module 163 can add (e.g., aggregate) the sensed reductant amount from reductant sensor 76 to the commanded reductant amount from the second doser 88 to get an approximation or estimated amount of reductant entering the SCR catalyst 90. A fault threshold may then be utilized with respect to the estimated amount of reductant entering the SCR catalyst 90: if the estimated amount is above the threshold, a fault may be triggered whereas if the estimated amount is below the threshold, a fault may not be triggered.

In some embodiments, the reductant module 159 is structured to interpret the amount of reductant slip across the DPF-SCR 70. The reductant module 159 may be further structured to control an amount of reductant injected into the exhaust flow (e.g., provided by the first doser 84, the second doser 88, etc.) based further on the amount of reductant slip. For example, if the amount of slip is above a threshold amount, then dosing may be reduced in order to reduce accumulation of reductant in the system.

The reductant analysis module 164 is further structured to compare the actual reductant slip (i.e., the actual amount of reductant downstream of the DPF-SCR 70, etc.) to at least one of the expected reductant slip (i.e., the expected amount of reductant downstream of the DPF-SCR 70, etc.) and a threshold value of reductant to determine whether the DPF-SCR 70 is the component of the SCR system 60 causing the NOx conversion efficiency fault. The reductant analysis module 164 is structured to determine that the DPF-SCR 70 is faulty in response to the actual reductant slip being greater than at the expected reductant slip (i.e., the actual amount of reductant downstream of the DPF-SCR 70 being greater than the expected amount of reductant downstream of the DPF-SCR 70, etc.) and/or the actual amount of reductant downstream of the DPF-SCR being greater than the threshold value of reductant. The threshold value of reductant may be preset within the reductant analysis module 164 and may be based on the respective aftertreatment system 22 and/or engine 20. In some embodiments, the difference between the actual amount of reductant and the expected amount of reductant is compared to a threshold reductant difference. The threshold reductant difference may be a magnitude difference, a percentage difference, or the like between the actual amount of reductant and the expected amount of reductant. The notification module 165 is structured to provide an alert or notification to an operator (e.g., a driver, a technician, etc.) via the operator I/O device 120 that the DPF-SCR 70 may be faulty responsive to the NOx conversion efficiently fault and the actual amount of reductant being greater than the expected amount of reductant (or the threshold reductant difference being exceeded) and/or the threshold value of reductant.

Figure 6:
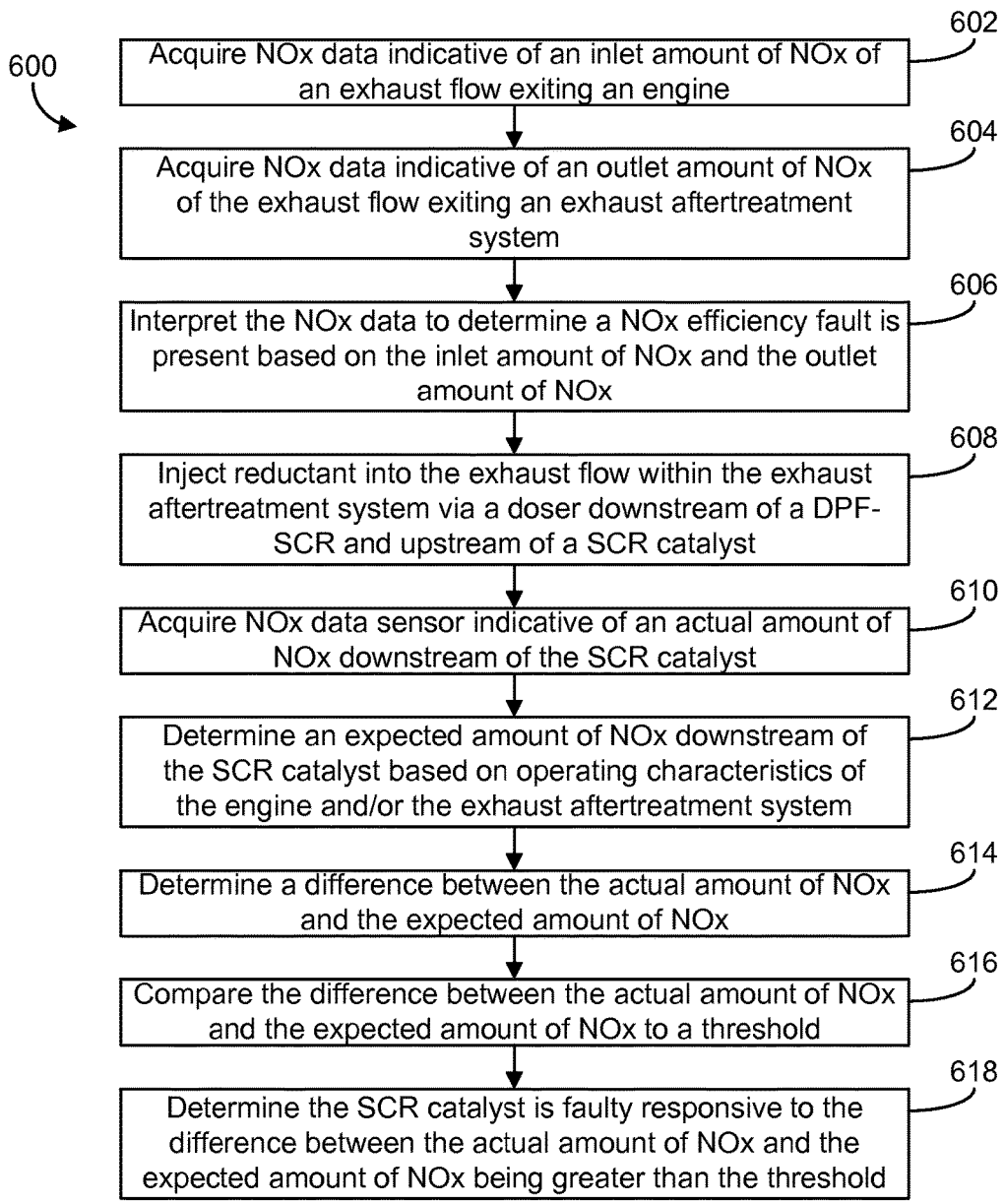
FIG. 6 is a flow diagram of a method of diagnosing a SCR catalyst of an exhaust aftertreatment system, according to an example embodiment.

Referring now to FIG. 6, a method 600 of diagnosing a SCR catalyst of an exhaust aftertreatment system is shown according to an example embodiment. In one example embodiment, method 600 may be implemented with the controller 150 of FIGS. 1-2. Accordingly, method 600 may be described in regard to FIGS. 1-2.

At process 602, the controller 150 acquires NOx data (e.g., the engine outlet NOx data 172, etc.) from a first NOx sensor (e.g., the inlet NOx sensor 12, a virtual NOx sensor, etc.) indicative of an inlet amount of NOx of an exhaust flow exiting an engine (e.g., the engine 20, etc.) and entering an exhaust aftertreatment system (e.g., the exhaust aftertreatment system 22, etc.). At process 604, the controller 150 acquires NOx data (e.g., the aftertreatment outlet NOx data 174, etc.) from a second NOx sensor (e.g., the outlet NOx sensor 14, a virtual NOx sensor, etc.) indicative of an outlet amount of NOx of the exhaust flow exiting the exhaust aftertreatment system. At process 606, the controller interprets the NOx data to determine whether a NOx conversion efficiency fault is present based on the inlet amount of NOx and the outlet amount of NOx.

At process 608, the controller 150 provides a command to a doser (e.g., the second doser 88, etc.) to inject reductant into the exhaust flow within the exhaust aftertreatment system downstream of a DPF-SCR (e.g., the DPF-SCR 70, etc.) and upstream of a SCR catalyst (e.g., the SCR catalyst 90, etc.). In one embodiment, the controller 150 passively provides the dosing command according to typical operation (e.g., when the inlet temperature at the DPF-SCR 70 reaches the temperature threshold, etc.). In other embodiments, the controller 150 actively provides the dosing command atypically (e.g., when the first doser 84 would typically provide the reductant injection, etc.).

At process 610, the controller 150 acquires NOx data from the second NOx sensor indicative of an actual amount of NOx downstream of the SCR catalyst. At process 612, the controller 150 determines an expected amount of NOx downstream of the SCR catalyst. The expected amount of NOx may be determined based on at least one of operating characteristics of the engine and operating characteristics of the exhaust aftertreatment system. As described above, the operating characteristics of the engine may include at least one of an engine speed, an engine torque, and an exhaust flow characteristics (e.g., volume flow rate, mass flow rate, etc.). The operating characteristics of the exhaust aftertreatment system may include at least one of a temperature of the exhaust flow, the amount of reductant injected into the exhaust flow, the inlet amount of NOx exiting the engine, and the outlet amount of NOx exiting the exhaust aftertreatment system.

At process 614, the controller 150 determines a difference between the actual amount of NOx and the expected amount of NOx. At process 616, the controller 150 compares the difference between the actual amount of NOx and the expected amount of NOx to a threshold NOx difference. In other embodiments, the controller 150 is structured to compare the actual amount of NOx to a threshold NOx value. At process 618, the controller 150 determines the SCR catalyst is faulty responsive to the difference between the actual amount of NOx and the expected amount of NOx being greater than the threshold NOx difference. In other embodiments, the controller 150 determines the SCR catalyst is faulty responsive to the actual amount of NOx exceeding the threshold NOx value.

In some embodiments, the controller 150 is further structured to determine that a diesel particulate filter including a coating of a selective catalytic reduction reaction catalyst (DPF-SCR) is faulty responsive to at least one of the actual amount of NOx differing from the expected amount of NOx by less than the threshold NOx difference and the actual amount of NOx being less than the threshold NOx value (i.e., Method 600 indicating that the SCR catalyst is not faulty). In some embodiments, the controller 150 is further structured to verify that the DPF-SCR catalyst is faulty (see, e.g., FIG. 7).

Figure 7:
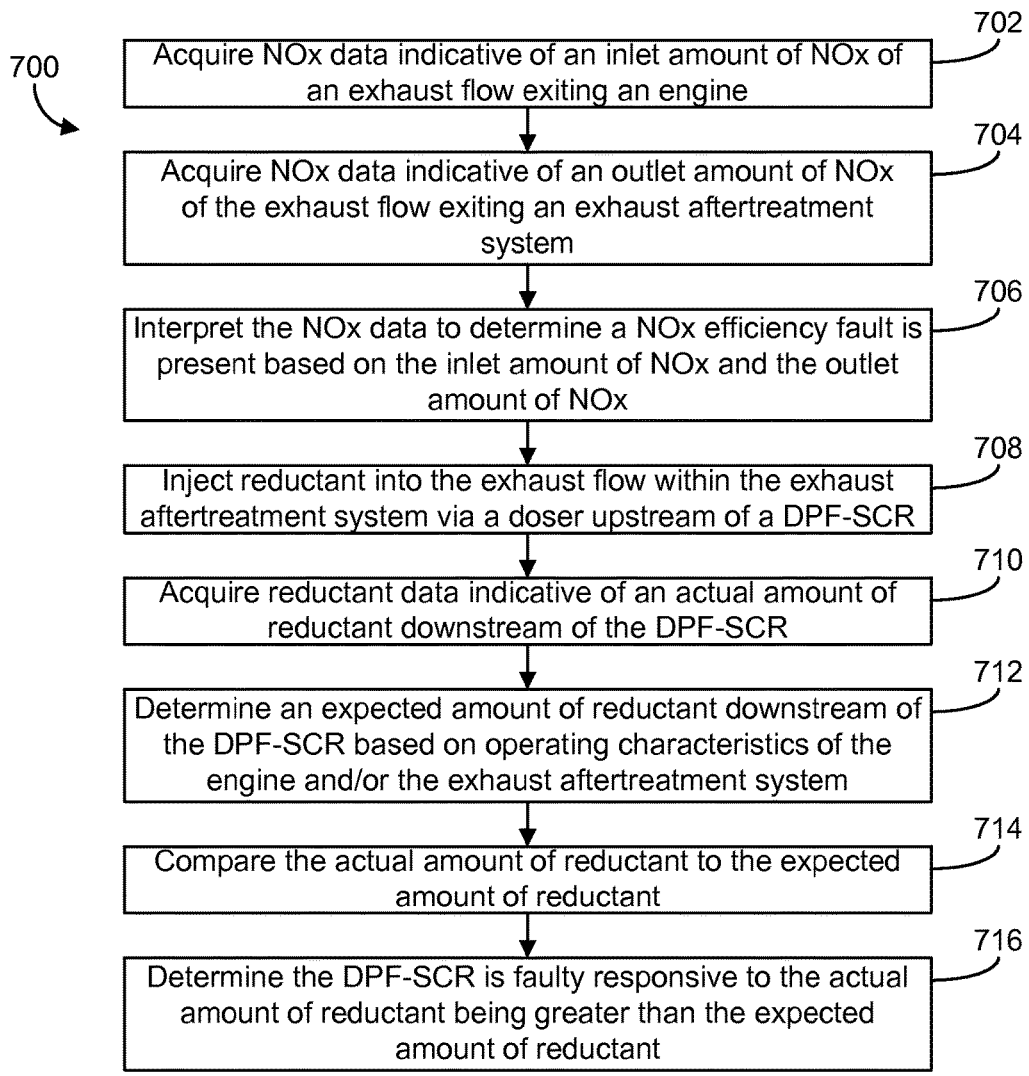
FIG. 7 is a flow diagram of a method of diagnosing a DPF-SCR of an exhaust aftertreatment system, according to an example embodiment.

Referring now to FIG. 7, a method 700 of diagnosing a DPF-SCR of an exhaust aftertreatment system is shown according to an example embodiment. In one example embodiment, method 700 may be implemented with the controller 150 of FIGS. 1-2. Accordingly, method 700 may be described in regard to FIGS. 1-2. Method 700 may implemented by the controller 150 to determine whether the DPF-SCR is faulty (i.e., independent of method 600) or to verify that the DPF-SCR is faulty as determined by the controller 150 (e.g., using the method 600, etc.).

At process 702, the controller 150 acquires NOx data (e.g., the engine outlet NOx data 172, etc.) from a first NOx sensor (e.g., the inlet NOx sensor 12, a virtual NOx sensor, etc.) indicative of an inlet amount of NOx of an exhaust flow exiting an engine (e.g., the engine 20, etc.) and entering an exhaust aftertreatment system (e.g., the exhaust aftertreatment system 22, etc.). At process 704, the controller 150 acquires NOx data (e.g., the aftertreatment outlet NOx data 174, etc.) from a second NOx sensor (e.g., the outlet NOx sensor 14, a virtual NOx sensor, etc.) indicative of an outlet amount of NOx of the exhaust flow exiting the exhaust aftertreatment system. At process 706, the controller interprets the NOx data to determine whether a NOx conversion efficiency fault is present. The NOx conversion efficiency is based on the inlet amount of NOx and the outlet amount of NOx.

At process 708, the controller 150 provides a command to a doser (e.g., the first doser 84, switches from the second doser 88 to the first doser 84, etc.) to inject reductant into the exhaust flow within the exhaust aftertreatment system upstream of a DPF-SCR (e.g., the DPF-SCR 70, etc.). In one embodiment, the controller 150 passively provides the dosing command according to typical operation (e.g., when the inlet temperature at the DPF-SCR 70 is below the temperature threshold, etc.). In other embodiments, the controller 150 actively provides the dosing command atypically (e.g., when the second doser 88 would typically provide the reductant injection, the temperature is above the temperature threshold, etc.).

At process 710, the controller 150 acquires reductant data (e.g., the reductant data 176, etc.) from a reductant sensor (e.g., the reductant sensor 76, a virtual reductant sensor, etc.) indicative of an actual amount of reductant downstream of the DPF-SCR. At process 712, the controller 150 determines an expected amount of reductant downstream of the DPF-SCR. The expected amount of reductant may be determined based on at least one of operating characteristics of the engine and operating characteristics of the exhaust aftertreatment system. At process 714, the controller 150 compares the actual amount of reductant to at least one of the expected amount of reductant and a threshold value of reductant. At process 716, the controller 150 either determines (e.g., if method 700 is run independent of method 600, etc.) or verifies (e.g., if method 700 is run subsequent method 600 and the SCR catalyst was determined to not be faulty, etc.) that the DPF-SCR is faulty responsive to at least one of the actual amount of reductant being greater than the expected amount of reductant and the actual amount of reductant being greater than a threshold reductant value (i.e., the DPF-SCR allowing for a greater than expected amount of reductant slip, etc.). In other embodiments, the controller 150 compares a difference between the actual amount of reductant and the expected amount of reductant to a threshold reductant difference.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
an exhaust aftertreatment system in exhaust gas receiving communication with an engine, wherein the exhaust aftertreatment system includes a selective catalytic reduction (SCR) system, the SCR system including a SCR catalyst and a diesel particulate filter having a coating of a SCR reaction catalyst (DPF-SCR) positioned upstream of the SCR catalyst;

a nitrogen oxide (NOx) circuit in exhaust gas communication with an exhaust flow of the exhaust aftertreatment system from the engine, the NOx circuit structured to:
  interpret NOx data indicative of an amount of NOx exiting the engine and an amount of NOx exiting the exhaust aftertreatment system; and
  determine a NOx conversion efficiency fault is present based on the amount of NOx exiting the engine and the amount of NOx exiting the exhaust aftertreatment system; and
a selective catalytic reduction (SCR) diagnostic circuit structured to determine at least one of the SCR catalyst of the exhaust aftertreatment system and the DPF-SCR of the exhaust aftertreatment system are responsible for the NOx conversion efficiency fault based on at least one of a reductant slip amount and a NOx conversion value across at least one of the SCR catalyst and the DPF-SCR.

2. The apparatus of claim 1, wherein the SCR diagnostic circuit is structured to determine the DPF-SCR is faulty responsive to the reductant slip amount across the DPF-SCR being greater than an expected amount of reductant slip across the DPF-SCR.

3. The apparatus of claim 2, further comprising a reductant circuit structured to interpret reductant data to determine the reductant slip amount across the DPF-SCR based on an amount of reductant downstream of the DPF-SCR and an amount of reductant injected into the exhaust flow upstream of the DPF-SCR.

4. The apparatus of claim 2, wherein the SCR diagnostic circuit is structured to determine the expected amount of reductant slip across the DPF-SCR based on an expected amount of reductant downstream of the DPF-SCR and an amount of reductant injected into the exhaust flow upstream of the DPF-SCR, wherein the expected amount of reductant downstream of the DPF-SCR is based on at least one operating characteristic of the engine and the exhaust aftertreatment system.

5. The apparatus of claim 1, wherein the SCR diagnostic circuit is structured to determine at least one of (i) the SCR catalyst is faulty responsive to a difference between the NOx conversion value across the SCR catalyst and an expected NOx conversion value across the SCR catalyst being greater than or equal to a threshold value and (ii) the DPF-SCR catalyst is faulty responsive to the difference between the NOx conversion value across the SCR catalyst and the expected NOx conversion value across the SCR catalyst being less than the threshold value, wherein the SCR diagnostic circuit is further structured to verify that the DPF-SCR is faulty responsive to the reductant slip amount across the DPF-SCR being greater than an expected amount of reductant slip across the DPF-SCR.

6. The apparatus of claim 5, wherein the NOx circuit is structured to interpret the NOx data to determine the NOx conversion value across the SCR catalyst based on an actual amount of NOx in the exhaust flow downstream of the SCR catalyst and the amount of NOx exiting the engine when reductant is injected into the exhaust flow downstream of the DPF-SCR and upstream of the SCR catalyst.

7. The apparatus of claim 5, wherein the SCR diagnostic circuit is structured to determine the expected NOx conversion value across the SCR catalyst based on the amount of NOx exiting the engine and an expected amount of NOx in the exhaust flow downstream of the SCR catalyst when reductant is injected into the exhaust flow downstream of the DPF-SCR and upstream of the SCR catalyst, wherein the expected amount of NOx downstream of the SCR catalyst is based on at least one operating characteristic of at least one of the engine and the exhaust aftertreatment system.

8. The apparatus of claim 7, wherein the at least one operating characteristic of the engine includes at least one of an engine speed, an engine torque, and an exhaust flow characteristic, and wherein the at least one operating characteristic of the exhaust aftertreatment system includes at least one of a temperature of the exhaust flow, an amount of reductant injected into the exhaust flow, the amount of NOx exiting the engine, and the amount of NOx exiting the exhaust aftertreatment system.

9. The apparatus of claim 1, further comprising an engine circuit structured to provide at least one command to the engine to modulate the amount of NOx exiting the engine, wherein the at least one command includes actuating an exhaust throttle of an exhaust gas recirculation system in exhaust gas receiving communication with the engine to alter the exhaust flow through the SCR catalyst and affect the amount of NOx in the exhaust flow.

10. The apparatus of claim 1, further comprising a reductant circuit communicably coupled to a reductant dosing system and structured to control an amount and a location of injection of reductant into the exhaust flow.

11. A system, comprising:
  an exhaust aftertreatment system in exhaust gas receiving communication with an engine, wherein the exhaust aftertreatment system includes a selective catalytic reduction (SCR) system, the SCR system including a SCR catalyst and a diesel particulate filter having a coating of a SCR reaction catalyst (DPF-SCR) positioned upstream of the SCR catalyst; and
  a controller communicably coupled to the engine and the exhaust aftertreatment system, the controller structured to:
  receive first nitrogen oxide (NOx) data indicative of an amount of NOx in an exhaust flow exiting the engine and second NOx data indicative of an amount of NOx in the exhaust flow exiting the exhaust aftertreatment system;
  determine a NOx conversion efficiency fault is present based on the first NOx data and the second NOx data; and
  determine at least one of the SCR catalyst and the DPF-SCR of the SCR system are faulty responsive to the NOx conversion efficiency fault.

12. The system of claim 11, further comprising an exhaust throttle of an exhaust gas recirculation system positioned upstream of the SCR catalyst, wherein the controller is further structured to actuate the exhaust throttle to alter the exhaust flow through the SCR catalyst and affect the amount of NOx in the exhaust flow.

13. The system of claim 11,
  wherein the exhaust aftertreatment system includes a first doser positioned upstream of the DPF-SCR, and a second doser positioned downstream of the DPF-SCR and upstream of the SCR catalyst;
  wherein the first NOx data is provided by a first NOx sensor and the second NOx data is provided by a second NOx sensor; and
  wherein the first NOx sensor and the second NOx sensor are structured as either one of or both of a physical sensor or a virtual sensor.

14. The system of claim 13, wherein the controller is further structured to:

facilitate injection of reductant into the exhaust flow within the exhaust aftertreatment system downstream of the DPF-SCR and upstream of the SCR catalyst via the second doser;

acquire NOx data from the second NOx sensor indicative of an actual amount of NOx downstream of the SCR catalyst;

determine an expected amount of NOx downstream of the SCR catalyst based on operating characteristics of at least one of the engine and the exhaust aftertreatment system; and determine the SCR catalyst is faulty responsive to a difference between the actual amount of NOx and the expected amount of NOx being greater than a threshold amount.

15. The system of claim 13, wherein the controller is further structured to:

facilitate injection of reductant into the exhaust flow within the exhaust aftertreatment system upstream of the DPF-SCR via the first doser;

acquire reductant data from a reductant sensor indicative of an actual amount of reductant downstream of the DPF-SCR;

determine an expected amount of reductant downstream of the DPF-SCR based on operating characteristics of at least one of the engine and the exhaust aftertreatment system; and determine the DPF-SCR is faulty responsive to the actual amount of reductant being greater than the expected amount of reductant.

\* \* \* \* \*

UNITED STATES PATENT AND TRADEMARK OFFICE
CERTIFICATE OF CORRECTION

PATENT NO. : 9,879,580 B2  
APPLICATION NO. : 14/830112  
DATED : January 30, 2018  
INVENTOR(S) : Aniket Gupta et al.

Page 1 of 1

It is certified that error appears in the above-identified patent and that said Letters Patent is hereby corrected as shown below:

In the Specification

Column 1, just beneath the CROSS REFERENCE TO RELATED APPLICATIONS section, please add the following heading and paragraph:
-- STATEMENT REGARDING FEDERALLY SPONSORED RESEARCH OR DEVELOPMENT
This invention was made with government support under Advanced Technology Powertrains for Light Duty Vehicles (ATP-LD) Program Award Number DE-EE0004125 awarded by the Department of Energy (DOE). The government has certain rights in the invention. --

Signed and Sealed this  
Seventeenth Day of December, 2019

Andrei Iancu  
*Director of the United States Patent and Trademark Office*